Patented Aug. 6, 1940

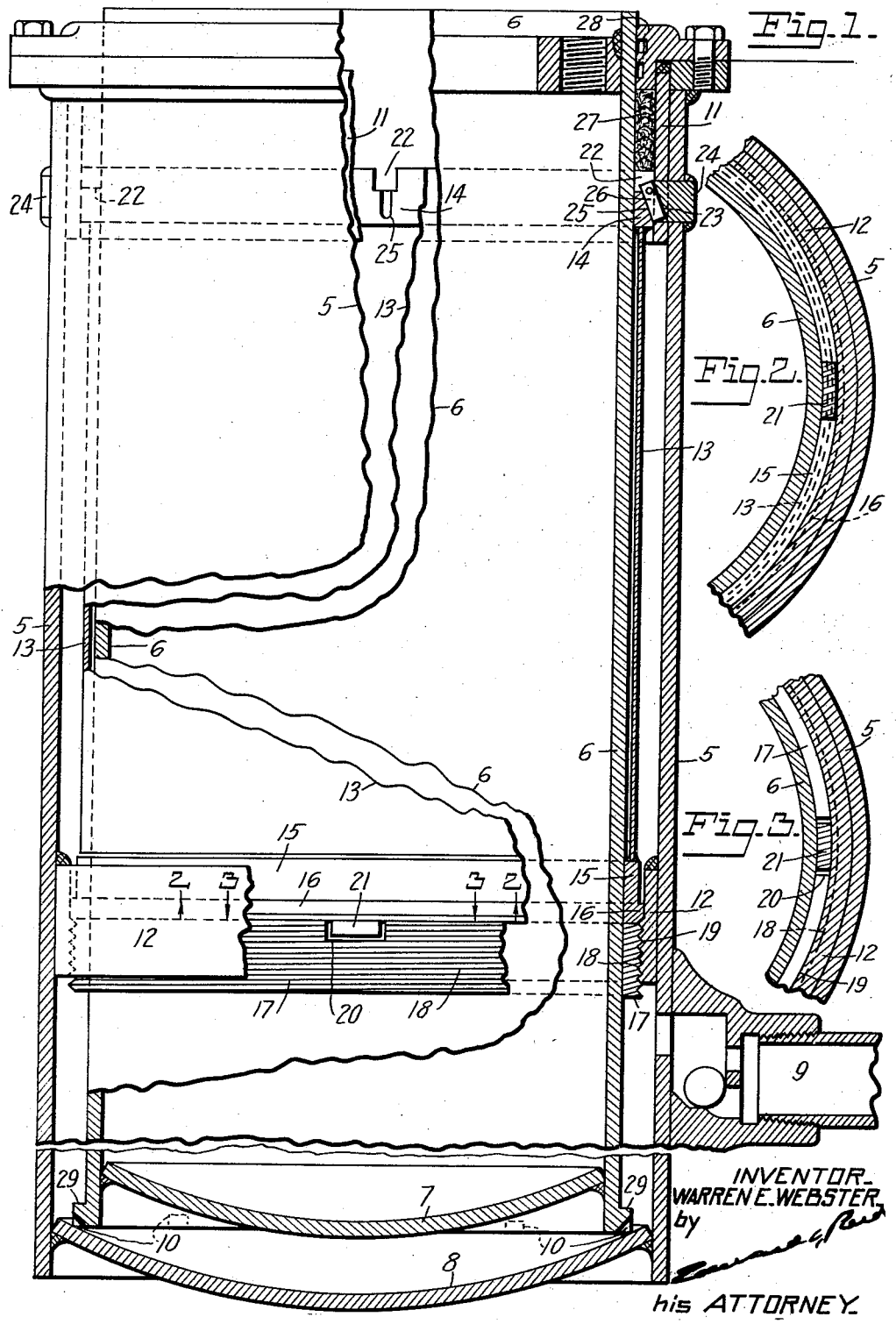

2,210,741

UNITED STATES PATENT OFFICE 2,210,741

FLUID OPERATED APPARATUS

Warren E. Webster, Dayton, Ohio, assignor to The Joyce-Cridland Company, Dayton, Ohio, a corporation of Ohio Application February 1, 1939, Serial No. 254,112

9 Claims. (Cl. 121—46)

This invention relates to a fluid operated apparatus of the type which includes a cylinder and ram, such as are commonly employed in automobile lifts. In such an apparatus it is customary to make the ram of an external diameter substantially less than the internal diameter of the cylinder and to provide the cylinder with spaced bearings to guide the ram and hold the same against tilting when it is in its elevated position. The ram is usually provided at its lower end with a stop to engage the lower bearing and limit the upward movement of the ram, but obviously if the bearings were permanently secured in the cylinder the ram could not be inserted in or removed from the same. The bearings are therefore removable so that they may be placed in position after the ram has been inserted in the cylinder and may be removed when it is desired to withdraw the ram. Such removable bearings are in common use but difficulty has been experienced in providing removable bearings which can be easily inserted and removed and which will be satisfactory in operation.

One object of the invention is to provide an apparatus of this kind with removable bearings which may be quickly and easily inserted in and properly located with relation to the cylinder, or withdrawn therefrom.

A further object of the invention is to provide such an apparatus with bearings which are connected one with the other for simultaneous insertion or removal, and with improved means for locating and supporting the bearings in the cylinder.

A further object of the invention is to provide such an apparatus with a removable positioning member for the bearings which may be attached to or detached from the cylinder by manipulating the connected bearings.

Other objects of the invention may appear as the apparatus is described in detail.

In the accompanying drawing Fig. 1 is a vertical section, partly broken away, of an apparatus embodying my invention; Fig. 2 is a transverse section through a portion of the apparatus on the line 2—2 of Fig. 1, looking in the direction of the arrows; and Fig. 3 is a similar view looking in the direction of the arrows 3, with the bearings removed.

In this drawing I have illustrated one embodiment of my invention and have shown the same as applied to an automobile lift comprising an outer casing or cylinder 5 within which there is mounted for longitudinal movement an elongate piston or ram 6 which is preferably hollow and is closed at its lower end by a head 7, here shown as connected with the cylindrical wall of the ram a short distance above the lower edge thereof, so that the head 7 will be spaced from the bottom 8 of the cylinder when the ram is in its lowermost position. The ram is elevated by the admission of fluid, such as oil under pressure, through an inlet 9 to the lower portion of the cylinder, this fluid passing beneath the ram and acting on the head 7 thereof. Ordinarily the fluid will have no difficulty in passing between the lower edge of the wall of the ram and the bottom of the cylinder but, if desired, the lower edge of the ram wall may be provided with notches 10 to permit the free flow of an oil through the same.

Arranged within the upper portion of the cylinder are upper and lower annular members 11 and 12, spaced a substantial distance one from the other and rigidly secured to the cylinder wall, as by welding, to form supports for the bearings. Mounted within the cylinder and surrounding the ram is a tubular structure or sleeve 13 which provides bearings for the ram. In the construction shown the intermediate portion of this tubular structure is relatively thin so that it does not contact with the ram and the tubular structure is provided at its upper end with a thicker portion 14 which engages the ram and constitutes an upper bearing for the ram, the bearing being held against lateral displacement by contact with the upper supporting member 11. At its lower end the tubular structure is provided with a thickened portion 15 which engages the ram and constitutes a lower bearing therefor, and is held against lateral displacement by contact with the lower supporting member 12, the bearing 15 having in the present instance a relatively narrow portion 16 which engages the supporting member. It will be understood that while these bearings are spaced one from the other to provide a proper support for the elevated ram they are both located in the upper portion of the cylinder.

For the purpose of supporting the tubular bearing structure in the cylinder and properly locating the same with relation thereto there is provided an annular part having means for detachably securing the same to the cylinder wall and which supports the tubular structure. Preferably this annular part is in the form of a separate ring 17 having means whereby it may be connected with or disconnected from the lower supporting member 12 by imparting rotary movement to the ring. In the form shown the ring is provided with external screw threads 18 which cooperate with internal threads 19 on the lower supporting member 12. The ring 17 and the lower portion of the tubular structure, which rests upon the ring, are provided with cooperating parts whereby rotary movement imparted to the tubular structure will be transmitted to the ring so that the latter may be screwed into or out of the supporting member by the manipulation of the tubular structure. In the arrangement shown the ring is provided in its upper edge with notches, one of which is shown at 20, and the lower portion of the tubular structure is provided with lugs 21 which are adapted to enter the notches 20 and so connect the ring with the tubular structure, the latter thus serving as a spanner wrench by means of which the ring may be screwed into or out of the supporting member. The downward movement of the tubular structure is limited by the engagement of the part 16 of the bearing 15 with the upper screw thread on the supporting member 12, thereby limiting the downward movement which can be imparted to the ring 17 by the tubular structure. The ring 17 preferably contacts with the ram and cooperates with the bearing member 15 to form the lower bearing for the ram. However, it is not essential that both the lower portion of the tubular structure and the ring should have bearing surfaces, as the bearing surface of either may be of such a character as to be sufficient for the intended purpose.

The tubular structure may be rotated in any suitable manner but is here shown as provided in its upper edge with a plurality of notches 22 adapted to receive a spanner wrench or the like by means of which the sleeve may be rotated. Suitable means are provided for holding the tubular structure normally against rotation and in the arrangement illustarted the cylinder is provided with a keyway 23, which is preferably formed in a block 24 inserted through openings in the cylinder wall and in the upper supporting member 11 and rigidly secured thereto, as by welding. The upper bearing member 14 is also provided with keyways 25, there being preferably a plurality of these keyways spaced about the bearing member and they are here shown as formed below and communicating with the notches 22. When the tubular structure has been inserted in the cylinder one of the keyways 25 may be caused to register with the keyway 23 and a key 26 then inserted in the alined keyways. A suitable packing 27 is interposed between the upper supporting member 11 and the ram above the upper bearing 14 and is held in place by a packing gland 28 rigidly secured to the upper end of the cylinder. This packing extends across the notches 22 and, being located above the key 26, will prevent any possibility of the key working its way out of the keyways.

The ram is provided at its lower edge with an annular flange or stop 29 adapted to engage the lower end of the ring 17 to limit the upward movement of the ram. This stop flange is of an overall diameter less than the internal diameter of the supporting members 11 and 12 so that the ram can be inserted through the supporting members. When the ram is in position the ring 17 is placed about the same and lowered until it engages the threads on the lower supporting member 12. The tubular structure is then placed about the ram and moved into engagement with the ring 17. If the lugs 21 in the lower bearing member do not at once enter the notches 20 in the ring they may be caused to so enter the notches by a slight rotation of the tubular structure. The tubular structure and the ring 17 are then rotated to screw the ring into the supporting member 12, this rotation being preferably continued until the lower bearing member engages threads on the supporting member 12. If at the end of this movement none of the keyways 25 in the tubular structure is in line with the keyway 23 of the cylinder the sleeve is rotated reversely to effect such alinement and the key 26 then inserted. After this the packing 27 is inserted and the gland 28 secured in position on the cylinder. When the ram is to be removed the gland and packing are removed, the key withdrawn and the tubular structure rotated in a reverse direction to screw the ring 17 out of the supporting member 12. After this has been done the tubular structure is removed and the ram then withdrawn, the stop flange 29 engaging the detached ring 17 and causing the same to be withdrawn along with the ram.

While I have shown and described one emgodiment of my invention I wish it to be understood that I do not desire to be limited to the details thereof as various modifications may occur to a person skilled in the art.

Having now fully described my invention, what I claim as new and desire to secure by Letters Patent, is:

1. In a fluid operated apparatus comprising a cylinder and a ram mounted for longitudinal movement in said cylinder, a supporting member rigidly secured to said cylinder and spaced from the upper end thereof, a bearing ring encircling said rim, said supporting member and said bearing ring having cooperating screw threads to detachably connect said bearing ring with said supporting member, and a tubular structure arranged about said ram, supported by said bearing ring and having an upper portion forming a bearing for said ram, said tubular structure and said bearing ring having cooperating parts to transmit rotary motion from said tubular structure to said bearing ring and screw the latter into and out of said supporting member.

2. In a fluid operated apparatus comprising a cylinder and a ram mounted for longitudinal movement in said cylinder, a supporting member rigidly secured to said cylinder and spaced from the upper end thereof, a bearing ring encircling said ram, said supporting member and said bearing ring having cooperating screw threads to detachably connect said bearing ring with said supporting member, and a tubular structure arranged about said ram, supported by said bearing ring and having an upper portion forming a bearing for said ram, said bearing ring having notches in the upper edge thereof and said tubular structure having lugs to enter said notches and connect said bearing ring and said tubular structure for rotation in unison.

3. In a fluid operated apparatus comprising a cylinder and a ram mounted for longitudinal movement in said cylinder, a supporting member rigidly secured to said cylinder and spaced from the upper end thereof, a ring encircling said ram and having means for detachably connecting the same with said supporting member, and a tubular structure arranged between said ram and the wall of said cylinder above said ring, held normally against rotation and having upper and lower portions forming bearings for said ram, said tubular structure having at its lower end means controlled by the rotation thereof for detaching said ring from said supporting member.

4. In a fluid operated apparatus comprising a cylinder and a ram mounted for longitudinal movement in said cylinder, a supporting member rigidly secured to said cylinder and spaced from the upper end thereof, a ring encircling said ram and having means controlled by the rotation thereof for connecting the same with and disconnecting the same from said supporting member, and a tubular structure arranged between said ram and the wall of said cylinder, held normally against rotation and having a part forming an upper bearing for said ram, and a part forming a lower bearing for said ram, said lower bearing resting upon said ring and said lower bearing and said ring having cooperating parts to connect the same for rotation one with the other, whereby said ring may be connected with and disconnected from said supporting member by the rotation of said tubular member.

5. In a fluid operated apparatus comprising a cylinder and a ram mounted for longitudinal movement in said cylinder, a supporting member rigidly secured to said cylinder and spaced from the upper end thereof, a ring encircling said ram and having notches in the upper edge thereof, said ring and said supporting member having cooperating screw threads to detachably connect said ring with said supporting member, a tubular structure surrounding said ram above said ring and having upper and lower portions forming bearings for said ram, said lower bearing portion being supported on said ring and having lugs to enter the notches in said ring, whereby said ring may be screwed into and out of said supporting member by the rotation of said tubular structure, and means for holding said tubular member normally against rotation.

6. In a fluid operated apparatus comprising a cylinder and a ram mounted for longitudinal movement in said cylinder, a supporting member rigidly secured to said cylinder and spaced from the upper end thereof, a ring encircling said ram and having notches in the upper edge thereof, said ring and said supporting member having cooperating screw threads to detachably connect said ring with said supporting member, a tubular structure surrounding said ram above said ring, having an upper portion forming a bearing of said ram and having a lower portion supported on said ring and cooperating therewith to form a lower bearing for said ram, said lower portion having lugs extending into the notches in said ring to cause the latter to rotate with said tubular structure, and means normally engaging the upper portion of said tubular structure to hold the latter against rotation.

7. In a fluid operated apparatus comprising a cylinder and a ram mounted for longitudinal movement in said cylinder, a supporting member rigidly secured to said cylinder and spaced from the upper end thereof, a ring encircling said ram and having notches in the upper edge thereof, said ring and said supporting member having cooperating screw threads to detachably connect said ring with said supporting member, a tubular structure surrounding said ram above said ring, having an upper portion forming a bearing for said ram and having a lower portion supported on said ring and cooperating therewith to form a lower bearing for said ram, said lower portion having lugs extending into the notches in said ring to cause the latter to rotate with said tubular structure, said lower portion also having means cooperating with said supporting member to limit the inward movement of said ring by said tubular structure, and means normally engaging the upper portion of said tubular structure to hold the latter against rotation.

8. In a fluid operated apparatus comprising a cylinder and a ram mounted for longitudinal movement in said cylinder, an upper supporting member rigidly secured to said cylinder in the upper portion of the latter, a lower supporting member rigidly secured to said cylinder in spaced relation to said supporting member, a tubular structure surrounding said ram and having an upper portion engaging said upper supporting member and forming an upper bearing for said ram, said tubular structure also having a lower portion engaging said lower supporting member and forming a lower bearing for said ram, an annular part extending about said ram, connected with said lower portion of said tubular structure for rotation therewith and having screw threaded connection with said lower supporting member, and releasable means for holding said tubular structure against rotation.

9. In a fluid operated apparatus comprising a cylinder and a ram mounted for longitudinal movement in said cylinder, an upper supporting member rigidly secured to said cylinder in the upper portion of the latter, a lower supporting member rigidly secured to said cylinder in spaced relation to said supporting member, a tubular structure surrounding said ram and having an upper portion engaging said upper supporting member and forming an upper bearing for said ram, said tubular structure also having a lower portion engaging said lower supporting member and forming a lower bearing for said ram, an annular part extending about said ram, connected with said lower portion of said tubular structure for rotation therewith and having screw threaded connection with said lower supporting member, the upper portion of said cylinder having a keyway and the upper portion of said tubular structure having a keyway adapted to register with the keyway of said cylinder, and a key in said keyways to hold said tubular structure against rotation.

WARREN E. WEBSTER.